United States Patent
Martin et al.

(10) Patent No.: US 9,569,416 B1
(45) Date of Patent: Feb. 14, 2017

(54) STRUCTURED AND UNSTRUCTURED DATA ANNOTATIONS TO USER INTERFACES AND DATA OBJECTS

(75) Inventors: John Martin, Centennial, CO (US); Jonathan Lucero, Centennial, CO (US)

(73) Assignee: IQNAVIGATOR, INC., Centennial, CO (US)

( * ) Notice: Subject to any disclaimer, the term of this patent is extended or adjusted under 35 U.S.C. 154(b) by 288 days.

(21) Appl. No.: 13/365,898

(22) Filed: Feb. 3, 2012

Related U.S. Application Data (60) Provisional application No. 61/440,161, filed on Feb. 7, 2011.

(51) Int. Cl.
*G06F 17/00* (2006.01)
*G06F 17/24* (2006.01)
*G06F 17/21* (2006.01)

(52) U.S. Cl.
CPC .................................. *G06F 17/241* (2013.01)

(58) Field of Classification Search
CPC ....................................................... G06F 17/30
USPC ....................................................... 715/255
See application file for complete search history.

(56) References Cited

U.S. PATENT DOCUMENTS

| | | | |
|---|---|---|---|
| 5,630,069 A | 5/1997 | Flores et al. | |
| 6,687,876 B1 | 2/2004 | Schilit et al. | |
| 6,789,109 B2 | 9/2004 | Samra et al. | |
| 6,950,982 B1 | 9/2005 | Dourish | |
| 7,404,185 B2 | 7/2008 | Zhang et al. | |
| 7,472,341 B2 | 12/2008 | Albornoz et al. | |
| 7,712,030 B1 | 5/2010 | Blau et al. | |
| 8,140,964 B2* | 3/2012 | Cragun et al. | 715/230 |
| 8,161,087 B2* | 4/2012 | Latzina | 707/831 |
| 8,448,058 B1* | 5/2013 | Hatwich | 715/204 |
| 2002/0075310 A1* | 6/2002 | Prabhu et al. | 345/764 |
| 2004/0064455 A1 | 4/2004 | Rosenzweig et al. | |
| 2005/0273700 A1 | 12/2005 | Champion et al. | |
| 2006/0106897 A1* | 5/2006 | Sapozhnikov et al. | 707/204 |
| 2007/0174762 A1* | 7/2007 | Plant | 715/512 |
| 2007/0208767 A1 | 9/2007 | Cotichini | |
| 2007/0245230 A1 | 10/2007 | Cherkasov | |
| 2008/0288792 A1 | 11/2008 | Zhang et al. | |
| 2009/0019356 A1 | 1/2009 | Deyab et al. | |
| 2009/0094552 A1 | 4/2009 | Watson et al. | |
| 2009/0199083 A1* | 8/2009 | Sar et al. | 715/231 |
| 2009/0327856 A1* | 12/2009 | Mouilleseaux et al. | 715/230 |
| 2010/0058233 A1* | 3/2010 | Chan et al. | 715/810 |
| 2010/0063971 A1* | 3/2010 | Cragun et al. | 707/741 |
| 2011/0154178 A1* | 6/2011 | Cragun et al. | 715/230 |
| 2011/0252420 A1* | 10/2011 | Tung et al. | 718/1 |
| 2011/0258556 A1* | 10/2011 | Kiciman et al. | 715/751 |
| 2012/0102031 A1* | 4/2012 | Shami et al. | 707/737 |
| 2012/0174087 A1* | 7/2012 | Bentzien et al. | 717/169 |
| 2013/0042200 A1* | 2/2013 | Armitage | 715/780 |

FOREIGN PATENT DOCUMENTS

WO   WO 2010/052598   5/2010

* cited by examiner

*Primary Examiner* — James J Debrow
(74) *Attorney, Agent, or Firm* — Perkins Coie LLP (57) ABSTRACT

The technology provides a method and system to annotate fields associated with a graphical user interface and data objects. The method and systems provide an annotation memory and annotation management system to allow saving annotations associated with fields and data objects. The annotations are fetched from the annotation memory for display along with the field as well as the data object.

17 Claims, 11 Drawing Sheets

STRUCTURED AND UNSTRUCTURED DATA ANNOTATIONS TO USER INTERFACES AND DATA OBJECTS

CLAIM OF PRIORITY UNDER 35 U.S.C. §119

This application claims priority to U.S. Provisional Patent Application Ser. No. 61/440,161, filed Feb. 7, 2011, which is incorporated herein as if set out in full.

CLAIM OF PRIORITY UNDER 35 U.S.C. §120

None.

REFERENCE TO CO-PENDING APPLICATIONS FOR PATENT

None.

BACKGROUND

Field

The technology of the present application relates generally to an annotation system, and more specifically, to an annotation system that provides multiple users the ability to privately or publicly annotate data and user interfaces of a database management system.

Background

Information, data, documents, data warehousing, document management, and data management is prevalent and almost a fundamental task in today's working environment. As more and more information becomes available to businesses and individuals, the ability to manage the massive amounts of information becomes increasing difficult.

Many conventional databases can be used to store and manage the massive amounts of data and information contained in the database. Some conventional databases include, for example, databases available from Oracle Corporation, Microsoft Incorporated, IBM Corporation, to name but a few companies that have databases and database management systems. Database management systems generally comprise one or more sets of executing codes operating on one or more connected processors that interface with a system memory, which may itself be localized or spread across a number of machines. The database management systems (sometimes referred to as a DBMS) generally allows one or more (and typically many) users to access the same set of centrally stored data. The system, in most cases, provides a user at a user workstation a graphical user interface (sometimes referred to as a GUI) in which a user may manipulate data or perform other functions as allowed by applications running on the workstation or a central processor. The GUI often allows the user to read, write, and manipulate data. Manipulated data and data written to the database may be available to other users in real time. The DBMS will have protocols to facilitate any reads, writes, and/or manipulation of data to avoid situations where two users attempt to read and manipulate data substantially simultaneously to avoid corruption of the data.

Much of today's information is stored in various databases or document management systems. Documents as used herein should broadly be construed to include electronic files containing one or more of the following non-exclusive examples: text files, image files, audio files, video files, audio/video files, or combinations thereof. Documents may be considered to be a compilation of data. Data may be raw or processed blocks of datum as is conventionally understood in the art.

In order to more readily assess information or data contained in documents, electronic annotation systems were developed to allow documents to be annotated such that notes or highlights would be saved with the document. In some cases, the annotations are contained in the display of the document, such as "notes in the margin" of a text document. In other cases, the annotations are superimposed on the document, such as, for example, a sticky note may be placed on a framed picture (sometimes referred to as meta data).

However, conventional annotation systems typically provide the ability to annotate documents or compilations of data. Data management systems and engines that warehouse and process the data contained in the data management systems could benefit from improved annotation systems. There is, therefore, a need in the art for an improved system and method to allow annotation of data and the user interfaces associated with managing the data.

SUMMARY

Aspects of the technology of the present application include systems, methods, and apparatuses to allow annotations to be added to data and user interfaces.

DETAILED DESCRIPTION

The technology of the present application will now be explained with reference to a database management system where data is warehoused in centralized servers and viewable at local or remote workstations having displays. The technology, in general, is described in relation to conventional database management systems; however, the technology of the present application would be useful for other memory management, database or data management systems. Moreover, the technology of the present application is explained using a conventional operating system, such as, for example, the Unix Operating Systems or a WINDOWS® operating system, or the like. One of ordinary skill in the art on reading the disclosure will now recognize that the technology of the present application will be useful in other environments and other operating systems. Other operating systems include, for example, Linux, Mac OS X, Solaris, to name but a few conventional operating systems. Moreover, while described as operating on a thin client, the technology of the present application also is useful using a fat client. A thin client would use a remote server or other processor to run the application being accessed by the thin client instead of the local processor as in a fat client. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
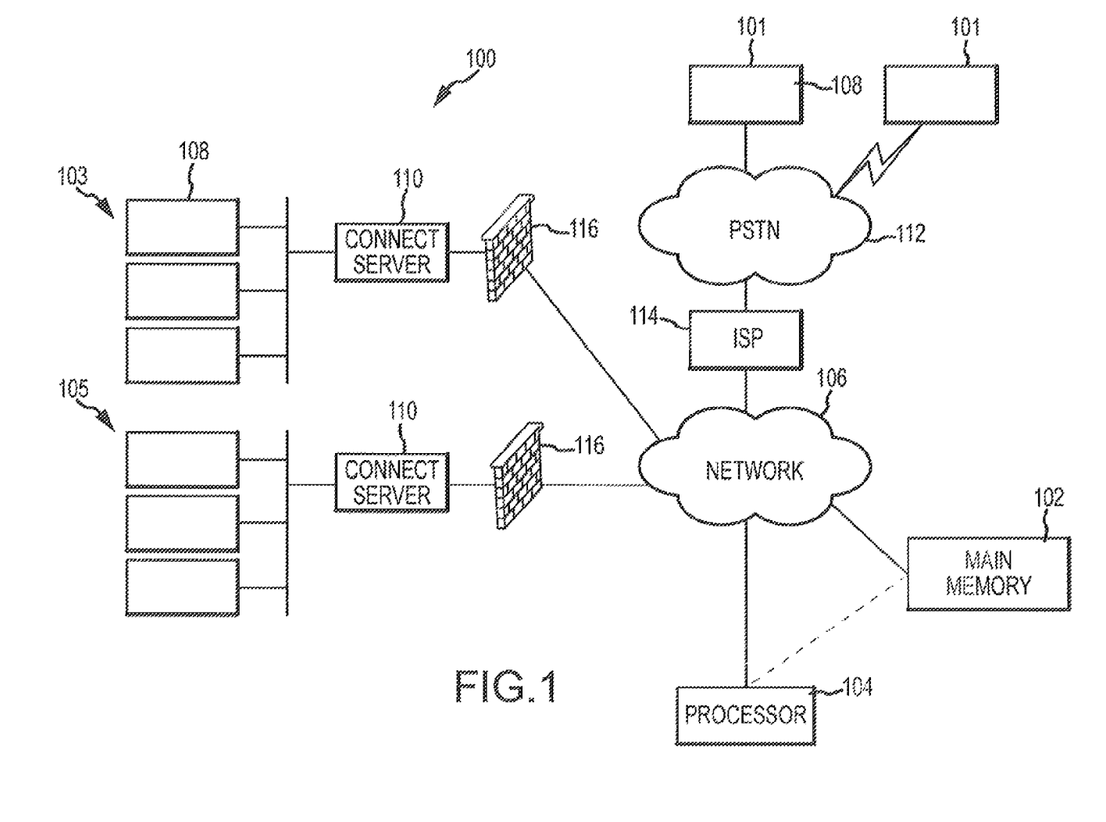
FIG. 1 is a functional block diagram of a networked computer system according to one aspect of the technology of the present application.

Referring now to FIG. 1, an exemplary networked computer system 100 is provided. Networked computer system 100 may facilitate the operation of a number of applications and software packages. For example, the networked computer system 100 may provide a vendor management system, a managed service program, etc. Networked computer system 100 has at least one main memory 102 or data storage facility that stores the data in a database or the like. The main memory may be a non-volatile or a volatile memory as a matter of design choice. A database management system (DBMS) 104, which is generally executed on one or more processors, is connected to the main memory 102 either through a network 106 or a direct connection as shown in phantom. DBMS may be co-located with main memory 102 and main memory 102 may be located in one or many machines. As explained above, DBMS are generally known in the industry and will not be further explained herein except as necessary for an understanding of the technology of the present application.

Figure 2:
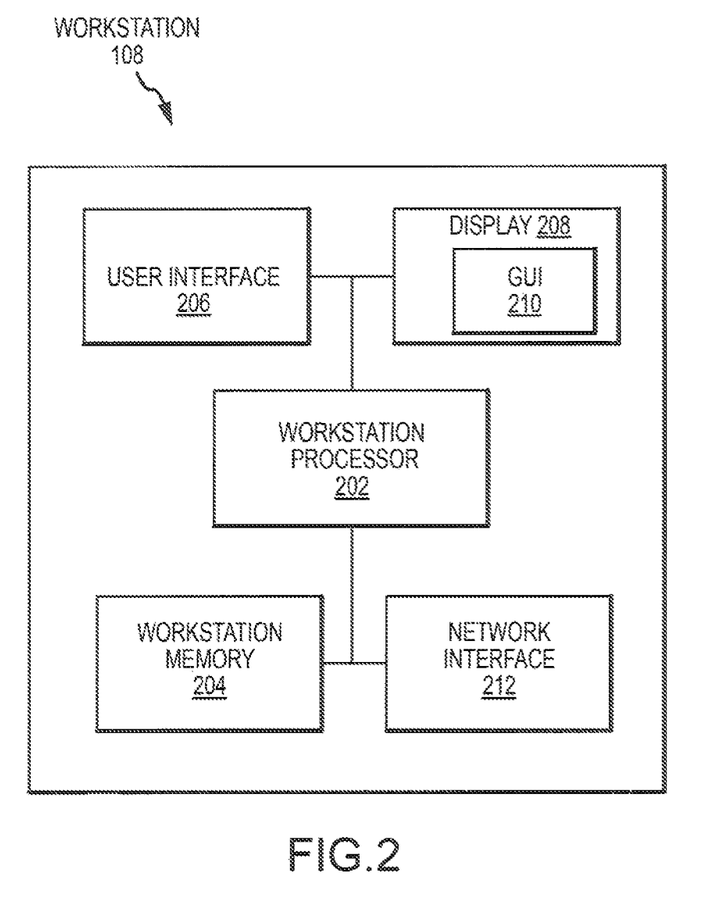
FIG. 2 is a functional block diagram of a workstation associated with the networked computer system of FIG. 1 according to one aspect of the technology of the present application

Various entities, such as, for example, entities 101, 103, 105, which may include individuals, companies, governments, educational institutions, or the like connect to memory 102 using workstations 108. Workstations 108 may be a thin or fat client workstation as explained above. Some workstations may include, for example, conventional desktop computers, laptop computers, mobile computers, handheld computers, Smartphones, portable digital assistant, or the like. For example, with reference to FIG. 2, work station 108 generally includes a processor 202, such as a microprocessor, chipsets, field programmable gate array logic, or the like, that controls the major functions of the workstation 108, such as, for example, requesting, fetching, manipulating, and transmitting data to DBMS 104 and memory 102 or the like. Processor 202 also processes various inputs and/or data that may be required to operate the workstation 108 as is conventional in the art. Workstation 108 also includes a workstation memory 204 that is interconnected with processor 202. Workstation memory 204 may be remotely located or co-located with processor 202. The memory 204 stores processing instructions to be executed by processor 202. The memory 204 also may store data necessary or convenient for operation of the workstation. For example, workstation memory 204 may store operations to run reports where the workstation accesses main memory 102 using the DBMS 104. Workstation memory 204 may be any conventional media and include either or both volatile or non-volatile memory. Workstation 108 also includes user interface 206 that is interconnected with processor 302. Such user interface 206 could include speakers, microphones, visual display screens, physical input devices such as a keyboard, mouse or touch screen, track wheels, cams or special input buttons to allow a user to workstation 108 and also data in memory 102. Typically, workstation 108 will include at least one display 208 that has a graphical user interface (GUI) 210 with clickable or interactive instructional buttons or tabs and data fields capable of being populated with data, either input via the GUI 210 or uploadable from main memory 102 or workstation memory 204. Workstation 108 has a network interface 212 to allow transmissions and reception of data between networked devices. Network interface 212 may be a data port such as a universal serial bus port, PCI bus, or the like. Workstations 108 may be directly connectable to network 106, but more typically, workstations 108 are connected to network 106 via a connect server 110 or in some older installations, perhaps workstation 108 is connectable to network 106 via a dial-up connection over a PSTN 112 to a Internet Service Provider 114.

Connections to main memory 102 and DBMS 104 may be through a firewall 116. As is generally understood, a firewall is designed to block unauthorized access while permitting authorized communications over the entity's local network. Because main memory 102 and processor 104 are accessible by independent entities, each entity, such as, for example, entities 103 and 105 may impose a firewall 116 to inhibit unauthorized data from being transmitted to or from its individual workstations 108. Moreover, main memory 102 typically will have integrated security to inhibit mingling of data specifically associated with certain entities.

Figure 3:
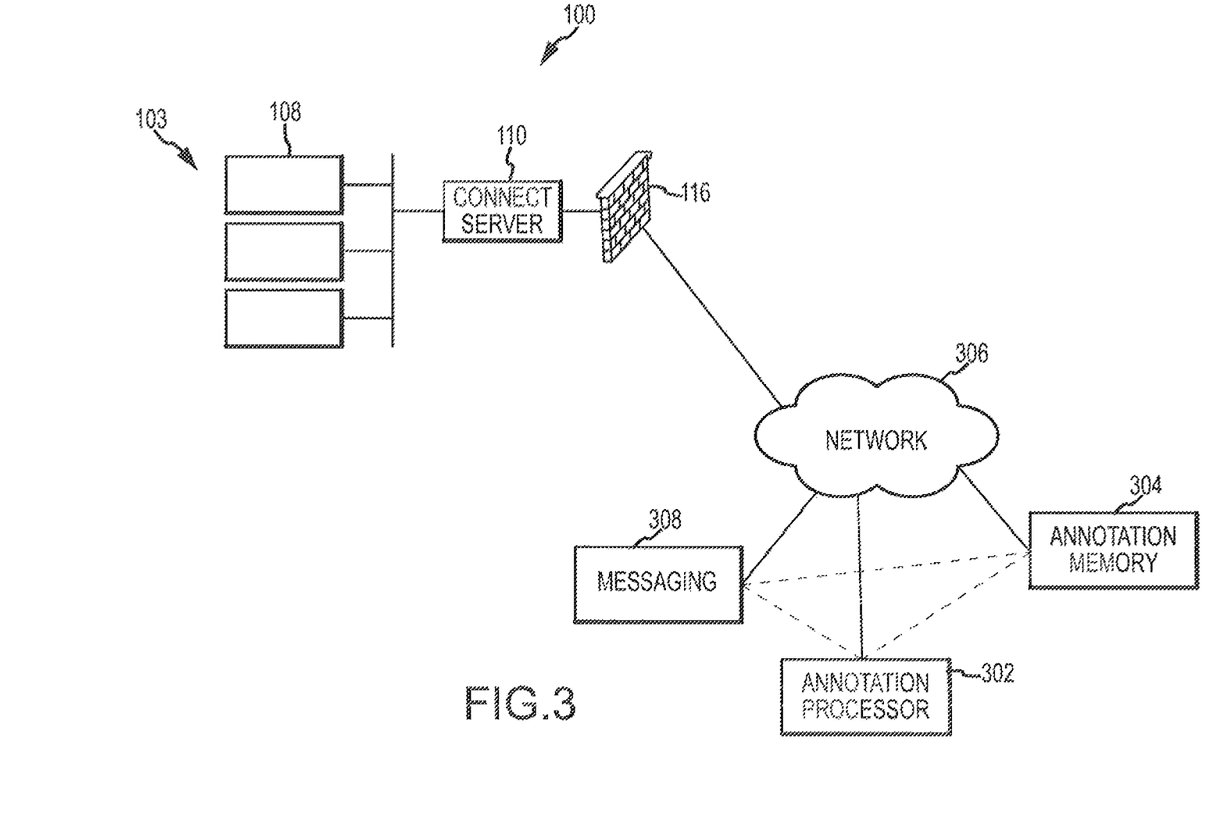
FIG. 3 is a functional block diagram of an annotation system according to one aspect of the technology of the present application.

As mentioned above, the GUI 210 facilitates access of data or information contained in main memory 102. Main memory 102, in many instances, may contain a significant amount of data, either raw or processed data. It is often difficult, especially for newer users, to understand and/or appreciate the data or information provided by the graphical user interface. Users may desire to provide annotations to the data or graphical user interface to supplement the information provided to make the data and/or graphical user interface more user friendly. Thus, as shown in FIG. 3, an annotation system 300 may be provided. For ease of reference while describing annotation system 300, data, whether contained as a discrete element or a compilation of elements, may generically be referred to as a data object contained in the database associated with main memory 102. The annotation system 300 is tied to the networked computer system 100 described above, but generally operates independently allowing for asynchronous transfers of information.

Annotation system 300 includes an annotation processor 302 networked to an annotation memory 304 through a network 306. Network 306, in most instances, will be the same as network 106 described above. As shown, annotation system 300 may work in conjunction with a messaging system 308 as will be further explained below. Also, annotation processor 302 and annotation memory 304 may be co-located with DBMS 104 and main memory 102, but they could be remotely located as well. While numerous entities, such as entities 101, 103, and 105, may be connected to annotation system 300 in a manner similar to the networked computer system 100 above, for ease of reference, only one entity 103 is shown in FIG. 3. Entity 103 provides a plurality of workstations 108 that are connected to annotation system 300 either directly or through a connection server 110. Because main memory 102 and annotation memory 304 are accessible by multiple entities, the firewall 116 may be provided to filter communication to and from workstations 108 of entity 103.

The annotation memory 304 and annotation processor 302 operate similar to a conventional DBMS as is generally known in the art. Moreover, even though identified as separate devices for convenience, the annotation memory 304 and annotation processor 302 may, in fact, be incorporated into, integral with, or part of the main memory 102 and processor 104. The annotation memory 304 is designed to accept both structured and unstructured annotations from users at workstations 108, as will be explained further below. The annotation memory, in other words, may accept text, images, video, audio, audio/video, or the like as annotations related to the object to which the annotation is attached.

One type of networked computer system where a centralized database may be accessed by several unrelated users 101, 103, and 105 includes a vendor management system (VMS) as mentioned above. A VMS system, such as the VMS system available from IQNavigator, Inc., may be an internet enabled web based application that allows entities 101, 103, and 105 to manage and procure services, such as, temporary staffing, HR hiring coordination, spend management, consolidated billing, other managed service programs and the like. The technology of a generic VMS is generally known in the industry and will not be explained herein except as necessary to the understanding of the technology of the present application. Most of the VMS have numerous screens associated with the user interface. Moreover, VMS that are provided under a software-as-a-service change with improved versions of the software. Thus, the connected entities may provide annotations in relation to particular data fields in a GUI 210 such that the annotation provides a useful hint, instruction, explanation of the field, data-entry help, information regarding changes, or the like regarding the fields in the GUI 210. For example, a helpful hint may be an annotation associated with an instructional seminar such as "always enter zero in this field." Other helpful hints or instructions may be relating to processing information such as, for example, "the remaining budget totals do not reflect costs and expenses until the costs and expenses are processed on the second Tuesday of the month." Still other helpful hints may include information about acceptable data such as "this field only accepts numeric information" or "this field accepts alpha/numeric information." In other annotations, the annotation may relate to previously entered or most frequently entered information such as, for example, a service provider field for a VMS may be annotated to indicate "Kelly Temps is the most frequently used provider" or "the last service provider was Manpower." Of course, other GUI annotations are possible including, for example, video demonstrations, images of properly filled out fields, etc. Thus, the above and following examples should not be construed as limiting but simply exemplary. In, addition to annotations on the GUI 210, the data objects themselves contained in the main memory 102 may be annotated. For example, in a VMS system, the time of a particular temporary staff member may be recorded, such as, for example, a value 43 may be stored. An annotation may be provided attached to the data field (as explained further below) such as "Total hours worked by staff personnel over time period X." Such that when that value is pulled by a user into a GUI or pushed by the VMS to a field, the data has the associated annotation displayed (of course the annotations may be selectively displayable or not by the user).

Figure 4:
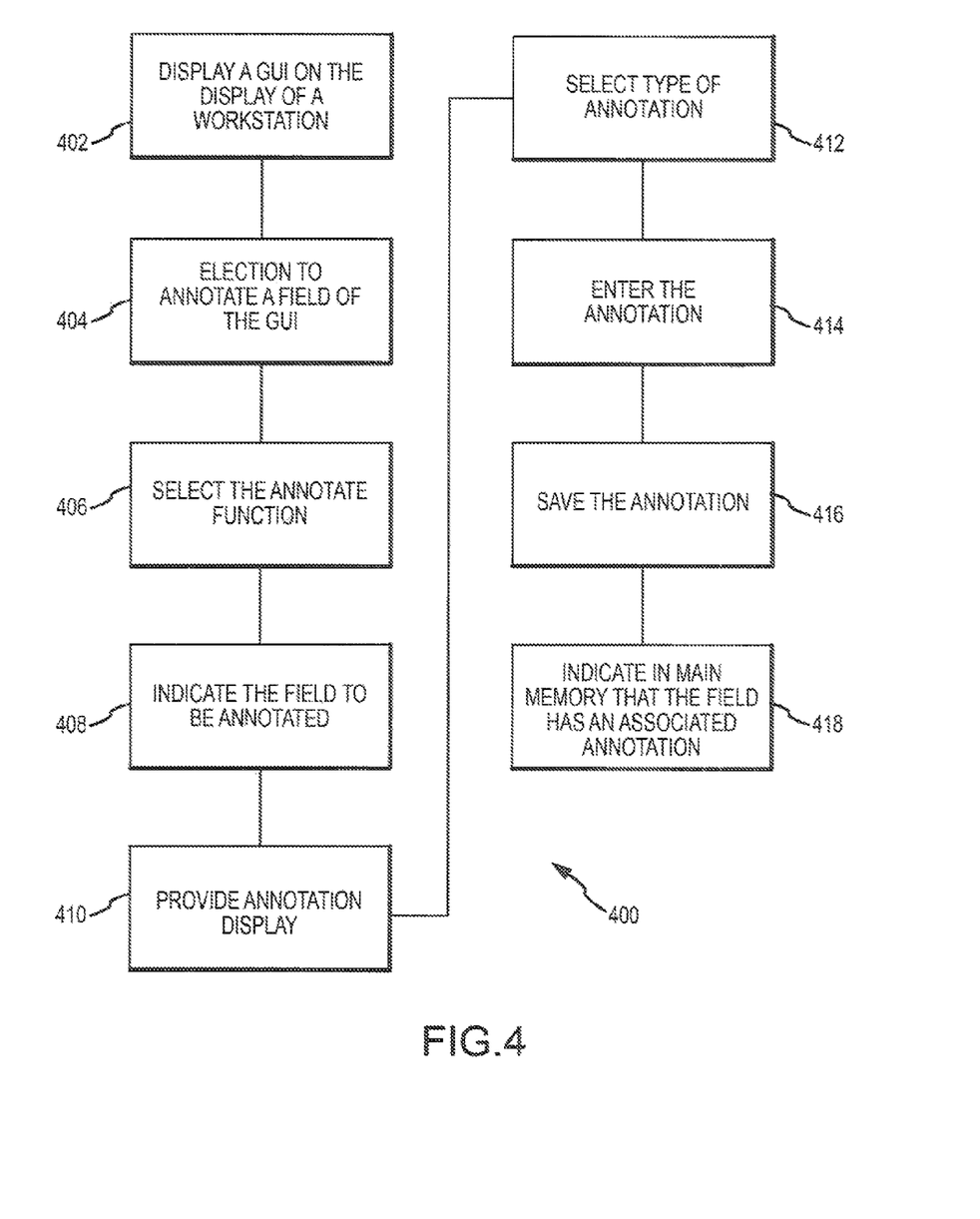
FIG. 4 is a flowchart illustrative of a methodology according to one aspect of the technology of the present application.

Referring now to FIG. 4, an exemplary methodology 400 associated with annotating a field of a GUI 210 is provided. While the methodology is explained below using a number of discrete steps, one of ordinary skill in the art will now recognize that certain of the discrete steps may be combined into a single step, single steps may be executed by a number of steps, and the steps may be performed in alternative order described without departing from the spirit and scope of the technology of the present application. It should also be recognized that the technology of the present application is being described in reference to a "software as a service" model in that the software provides a graphical user interface to each of the subscribers. Thus, mechanisms are placed to distinguish annotations of one entity from annotations of another entity. To the extent the software was provided as a package to an individual company, it may not be necessary to distinguish between entities that provide the annotations.

Figure 5:
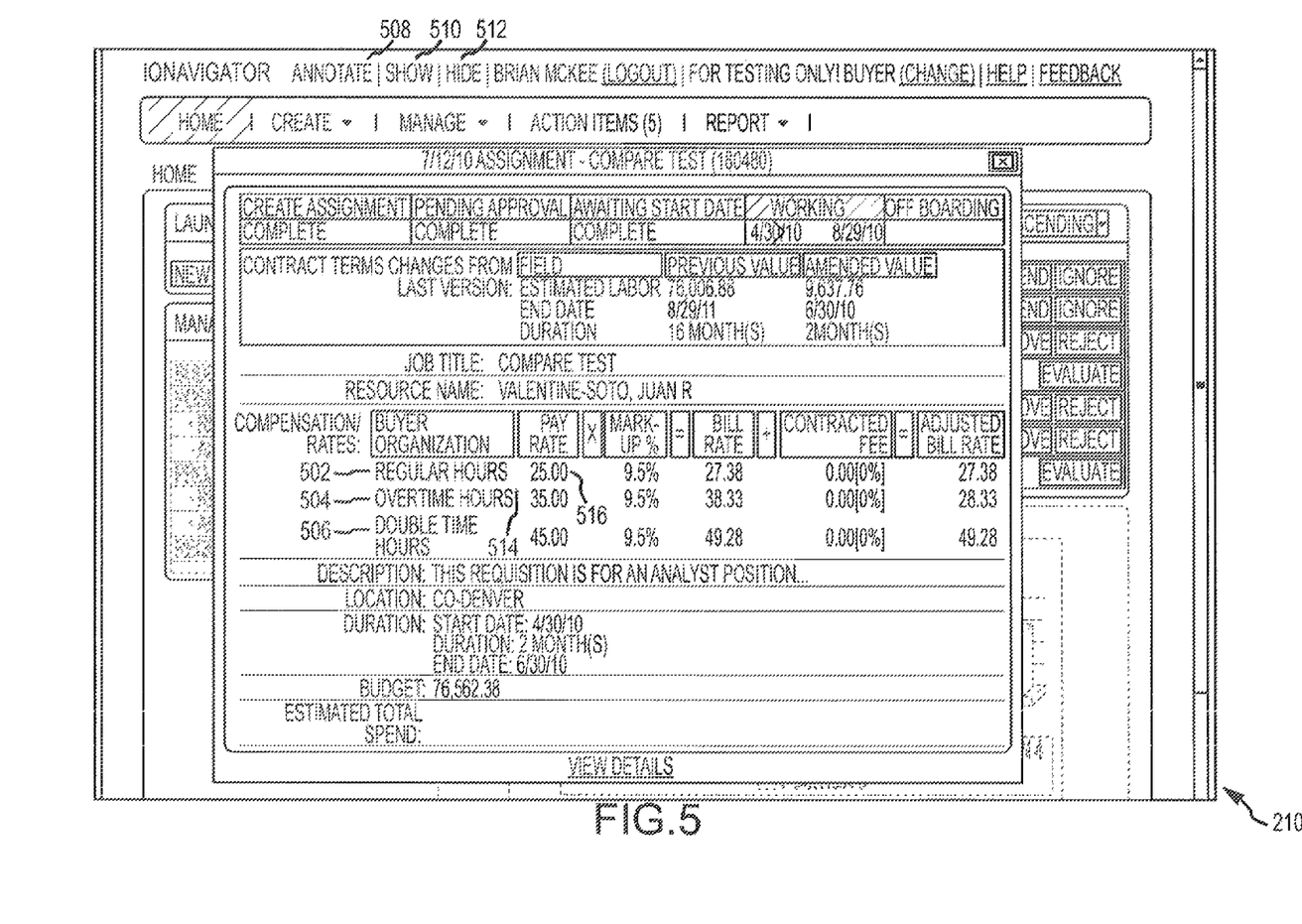
FIG. 5 is an exemplary screen of a graphical user interface according to one aspect of the technology of the present application.

As shown by methodology 400, the process begins by displaying a GUI 210 to the display of a workstation 108, step 402. The GUI may be streamed or downloaded from processor 104 or be resident on workstation 108. A sample GUI 210 is shown in FIG. 5. With reference to FIG. 5, the GUI 210 has a number of populated fields including budgeted regular hours 502, overtime hours 504, and double time hours 506. Generally, while different from state to state, country to country, etc., regular hours, overtime hours, and double time hours have a particular meaning for entity 103, for example. Thus, entity 103 may elect to annotate the overtime hours field 504, step 404. To initiate the annotation sequence, the user selects the annotate function 508 on GUI 210, step 406, and indicates the field to be annotated, which, in this example, is field 504, step 408.

Notice, while described as separately selecting an annotation function and indicating which field to be annotated, the user may select an annotation function using a number of different mechanisms. For example, the user could "right click" on field 504 that displays a popup menu with an annotation function, etc.

In this example, optionally, the annotation processor 302 may cause an annotation display to be displayed to the user, step 410. The annotation display may provide options for various types of annotations such as, for example, provide a file attachment as the annotation;
create a textual annotation;
complete a form annotation; or
upload an annotation;

or other types of annotations and files. The user would next select the particular type of annotation for the field 504, step 412. In some applications, steps 410 and 412 may not be necessary as only a single type of annotation is allowed, such as, for example, a textual annotation. Next, the annotation is entered by the user, step 414. For example, the user may enter text information regarding the field. For example, in relation to the example of an Overtime Hours field 504, the user may enter text describing what overtime hours are in the local jurisdiction. Such an annotation may state, "U.S. Overtime applies to non-exempted employees who work more than the standard work week under the Fair Labor Standards Act of 1937." Next, the user would save the annotation to annotation memory 304, step 416, and the GUI 210 field 504 would be flagged, tagged, or otherwise marked in main memory 102 to indicate the GUI 210 field 504 has an associated annotation, step 418. Note that the indication would include the entity identification as well such that if entity 103 (as in the example) has annotated the GUI 210 field 504, the annotation will be provided when GUI 210 is provided by DBMS 104 because the system will fetch the annotation. However, entity 105 will not see the annotation associated with entity 103.

Figure 4A:
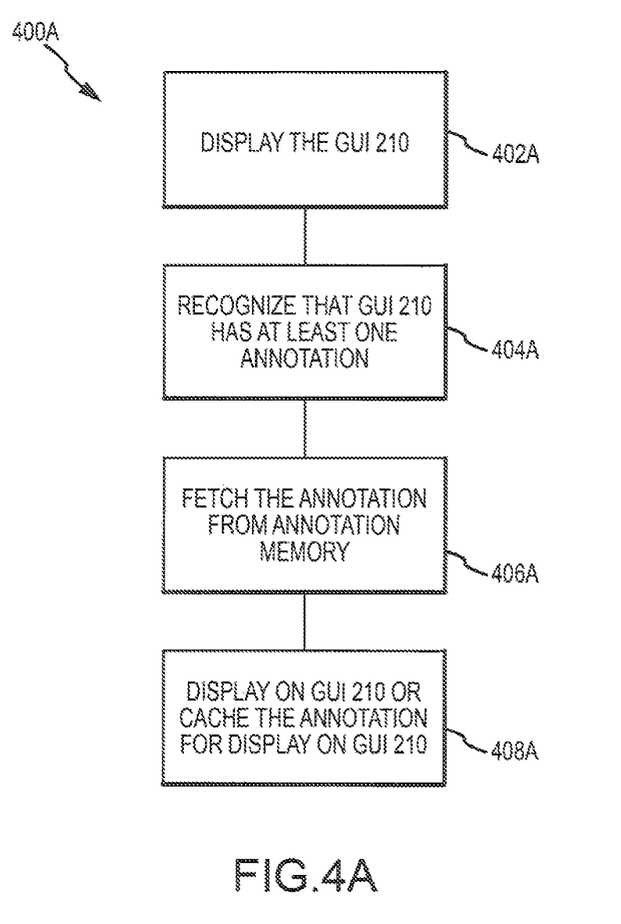
FIG. 4A is a flowchart illustrative of a methodology according to one aspect of the technology of the present application.

Similarly, referring now to FIG. 4A, a flowchart 400A is provided illustrating a methodology for displaying the GUI 210 having at least one field annotated, in this case field 504. First, at step 402A, the application is activated to display the GUI 210 on workstation 108. Substantially simultaneously, the indicia or flag associated with field 504 is recognized by the processor, step 404A. The recognition of the indication causes the processor to fetch from annotation memory the annotation associated with field 504, step 406A. The processor displays or caches the annotation for display, step 408A. The annotation may be cached in workstation memory 204. The system may be set up to either automatically display annotations or not as a matter of design choice.

Figure 6:
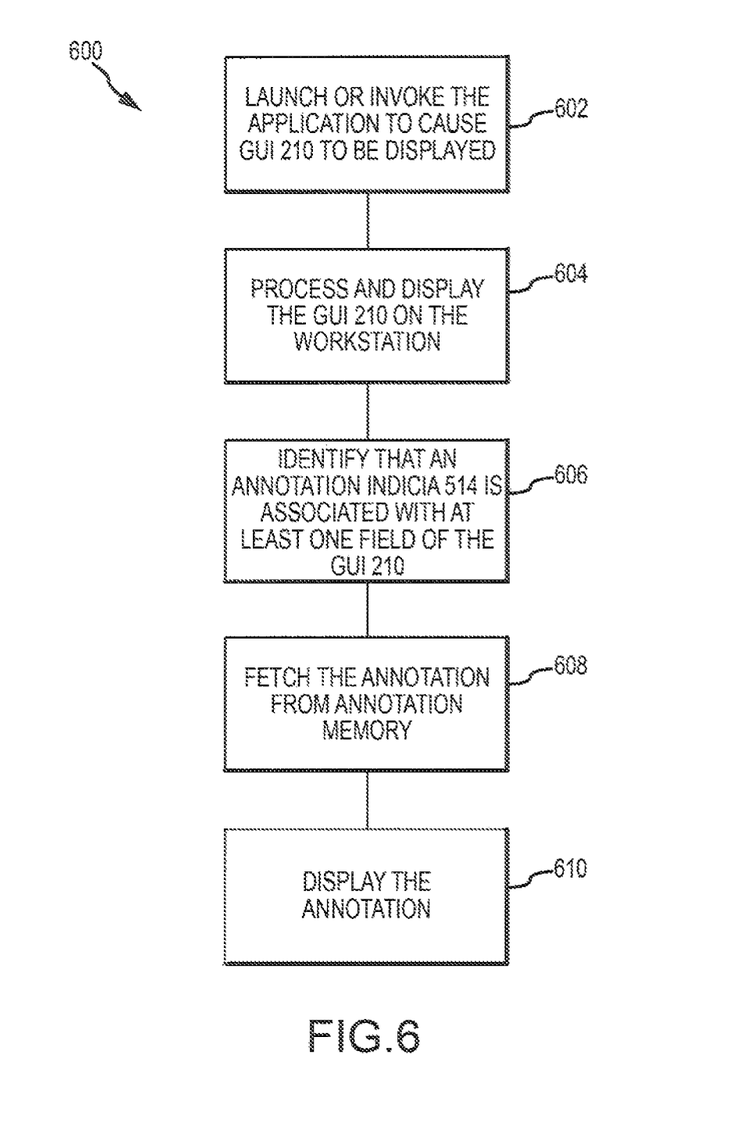
FIG. 6 is a flowchart illustrative of a methodology according to one aspect of the technology of the present application.

In other words, when GUI 210 is next displayed to entity 103, the GUI 210 would be provided with the annotation associated with field 504. The annotation would be applicable to all GUIs 210 associated with the entity 103 in this example. The annotations may be selectively shown or hidden by activation of respective icons 510 and 512 on GUI 210. While only show or hide icons 510, 512 are provided, other non-limiting functional buttons may include, for example, shown only screen field annotations, shown only data annotations, shown only text annotations, etc. While shown or active, the annotation may not in fact be displayed, but rather the annotation only displays when the field is activated, such as by clicking on the field and/or positioning a mouse icon over the field, etc. Annotated fields will typically be displayed with indicia 514 indicative that an annotation is associated with the field. The activation of indicia 514 provides two functions. First, it identifies to the user viewing GUI 210 than an annotation exists for the field. Second, it may be used as the flag or indication to be recognized that triggers the processor to fetch the annotation for field 504 from memory 304. The annotation may be streamed or uploaded to workstation 108. For example, FIG. 6 provides another exemplary methodology 600 associated with displaying a GUI 210 that had been previously annotated. First, the user at workstation 108 activates the GUI 210, step 602. This may be performed by selecting the icon to invoke a program or launch a program. The GUI 210 is processed and displayed on workstation 108, step 604. The application processor identifies that an annotation exists for the GUI 210 by recognizing indicia 514 associated with a field, such as field 504. The application processor would either fetch the annotation from annotation memory 304 on recognition of indicia 514 (which may provide a map to the appropriate memory location) or the application processor would fetch the annotation from annotation memory 304 when the user requested or attempted to display the annotation, step 506. Once fetched, the annotation may be displayed, step 508, or cached, step 510, in workstation memory 204 for display as required.

Figure 7:
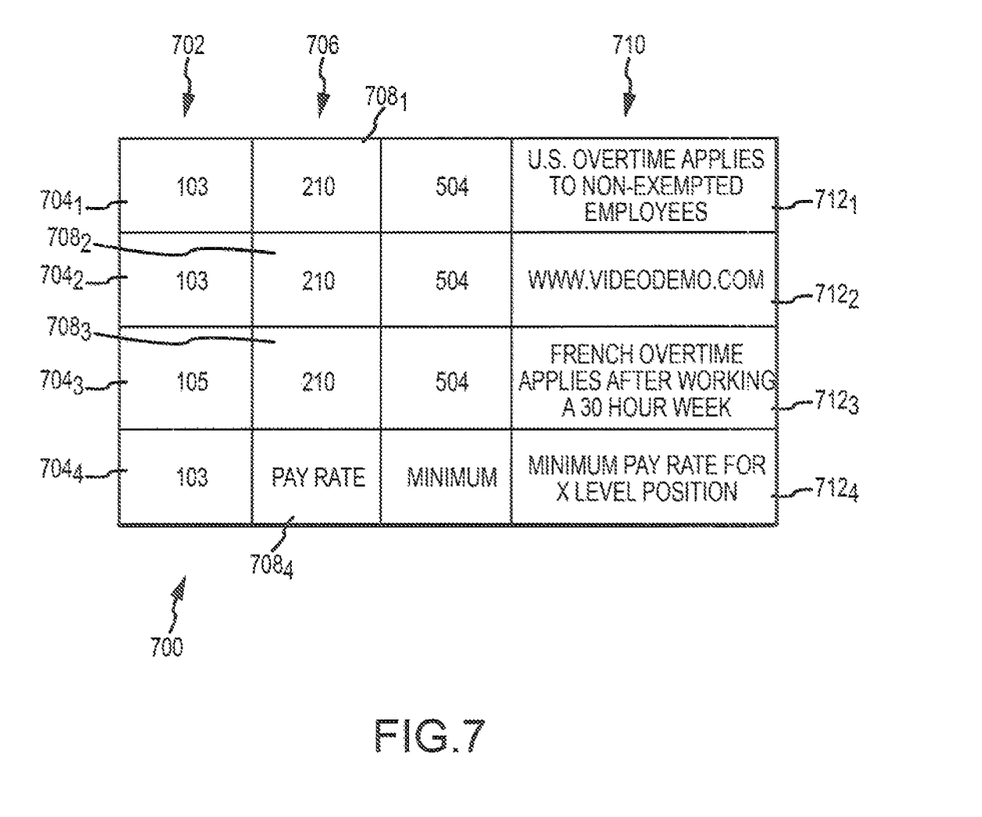
FIG. 7 is an exemplary data block consistent with certain aspects of the technology of the present application.

Annotation memory 304 may contain information regarding field 504 as shown in data block 700. Data block 700 is shown in a matrix of 4 rows with 4 columns for exemplary purposes. The data block 700 may be considered to have several fields to identify information about the stored annotation. For example, column 702 has a number of fields $704_{1-n}$. Field 704 shows in this example what entity the annotation is associated with. Thus, annotations established by entity 103 will only be displayed to workstations 108 associated with entity 103. Column 706 also contains a number of fields $708_{1-m}$. Fields 706 provide an indication of what field associated with GUI 210 the annotation is associated with. Finally, column 710 contains a number of fields $712_{1-l}$. Fields 712 contain the actual annotations, which may be textual data, links to URLs or files, etc. Data block 700 could be maintained with an additional security feature such that certain annotations are displayable by groups of users. In this case, column 702 distinguishes between entities 103 and 105, but additional columns could be provided to distinguish between supervisors, managers, staff, etc. such that managers may set an annotation for other managers. Alternatively to identifying in data block 700 the entity to which an annotation is assigned, annotation memory 304 may be segregated such that entity 103 only has access to particular portions of the memory to avoid cross pollination.

Generally, annotations for data objects or fields will inherit the security associated with the data object or field (i.e., if the user can see the data or field, the user can see the annotation associated with the data or field). However, it is possible to increase the security levels for annotations, if desired, by programming a security field that would need to match a user's security for the user to see the annotation.

Software as a service providers may provide annotations that are global. For example, when a new version of GUI 210 is provided, the provider may add an annotation (that may be pushed to all or some part of the users) that may provider new instructions, information regarding screen changes, etc. Additionally, frequently asked questions or the like may prompt the software as a service provider to push annotations to all entities regarding answers to frequently asked questions, updates, changes, future modules, future or improved functionality, or other helpful hints.

As can be seen with data block 700, more than 1 annotation may be associated with any particular field (or as explained below data object). The annotation display (which will may be a bubble, a popup display, a new window, etc.) may be insufficient to display all the annotations at once. In this case, the window associated with the annotations may be scrollable with the most recent or most relevant annotation being displayed first. Relevant annotations may be based on feedback from subsequent users voting on the helpfulness of the annotation or the correctness of the annotation. In certain situations, a pre-defined threshold may be set such that a certain number of negative votes causes the deletion of the annotation from the annotation memory 304. Alternatively, the annotation system 300 may have a system to provide a hierarchy such that higher priority annotations are shown first while lower priority annotations are shown subsequently.

Figure 8:
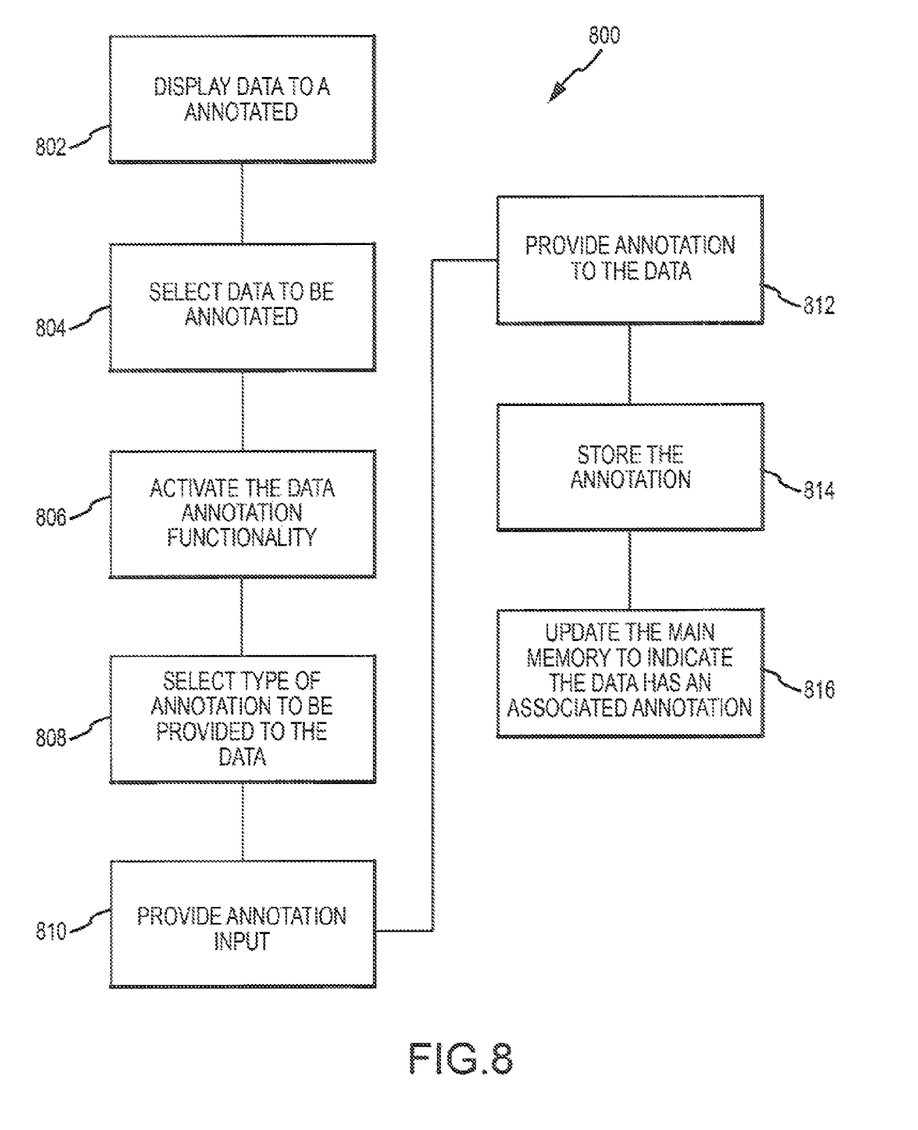
FIG. 8 is a flowchart illustrative of a methodology according to one aspect of the technology of the present application.

While the above describes a system in which an annotation may be provided to particular fields associated with GUIs 210, the annotation system 300 also provides a mechanism to store information regarding particular data objects. For example, referring back to FIG. 5 and GUI 210, a pay rate of 25.00 is provided in field 516 of the GUI 210 for regular hours for Resource Valentine-Soto, Juan R. under the job title—Compare Test. An annotation may be appended to the data 25.00 such as, for example, "minimum pay rate for X level position." The annotation may be appended to the data object in a manner similar to those described above with relation to GUI fields and as outlined by the flowchart 800 in FIG. 8. In this case, typically, the data to be annotated will be displayed in a field associated with the GUI 210 on a user workstation, step 802. However, it is possible to manipulate the data directly by the provider. The user at workstation 108 would select the data to be annotated, step 804, and activate the data annotation application or functionality, step 806. The activation of the data annotation system may be any conventional means including launching a new program or invoking a launched program. Often the annotation system will be activated and the invoking step may include highlighting the data to be annotated (or otherwise selecting the data) and "right clicking" the highlighted data to provide a popup menu. Annotate data (or other equivalent indicia) may be an available option in the popup menu. Once the annotate data functionality is activated, optionally, an annotation display is provided requesting the user to select the type of annotation, step 808. The types of annotations may be any of the annotations identified above. The annotations allowed may be structured or unstructured as is generally known in the art. Once the type of annotation is selected (or if only one type of annotation is allowed), the annotation input is provided, step 810. The input may be a file location if the annotation is a link to a file, such as an audio/video annotation. The input may be a text window if the annotation is a text document. The input may be a microphone for an audio annotation. Other appropriate inputs would be used for other annotations. Next the annotation is provided, step 812, and the annotation is stored, for example, in annotation memory 304, step 814, and main memory 102 is updated to indicate the data object in main memory 102 has an associated annotation, step 816. For example, referring back to FIG. 7, data block 700, entity 103 has a data point relating to pay rates and the particular minimum pay rate. The annotation for the data object pay rate is "minimum pay rate for X level position. The indication in main memory 102 may be setting a flag indicating with a link to the appropriate annotation.

Figure 9:
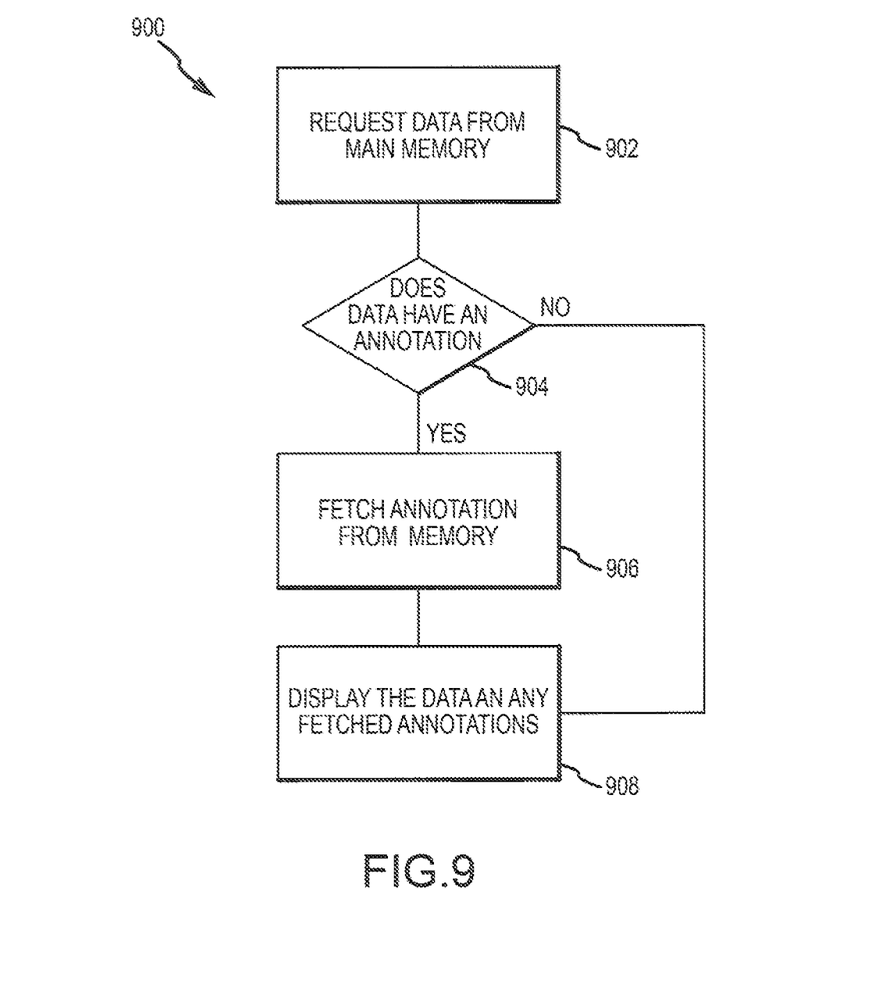
FIG. 9 is a flowchart illustrative of a methodology according to one aspect of the technology of the present application.

Referring now to FIG. 9, a flowchart 900 relating to displaying the data with an annotation is provided. First, a request is made to main memory 102 for the data object, step 902. The processor determines whether an annotation is associated with the data object, step 904. The determination may be made by recognizing a link or a flag set in main memory 102. The processor then fetches the indicated annotation from annotation memory 304, step 906, and displays the annotation along with the data object, step 908. Optionally, the annotation may be cached for display as requested.

Data objects, of course, may be changed. For example, assume the minimum pay rate for X level position was changed from 25.00 to 26.00. The annotation processor would note the change and may automatically annotate the object with an annotation indicating the change, such as, for example, "25.00 changed to 26.00 on day x of month y of year z by user ABC."

Figure 10:
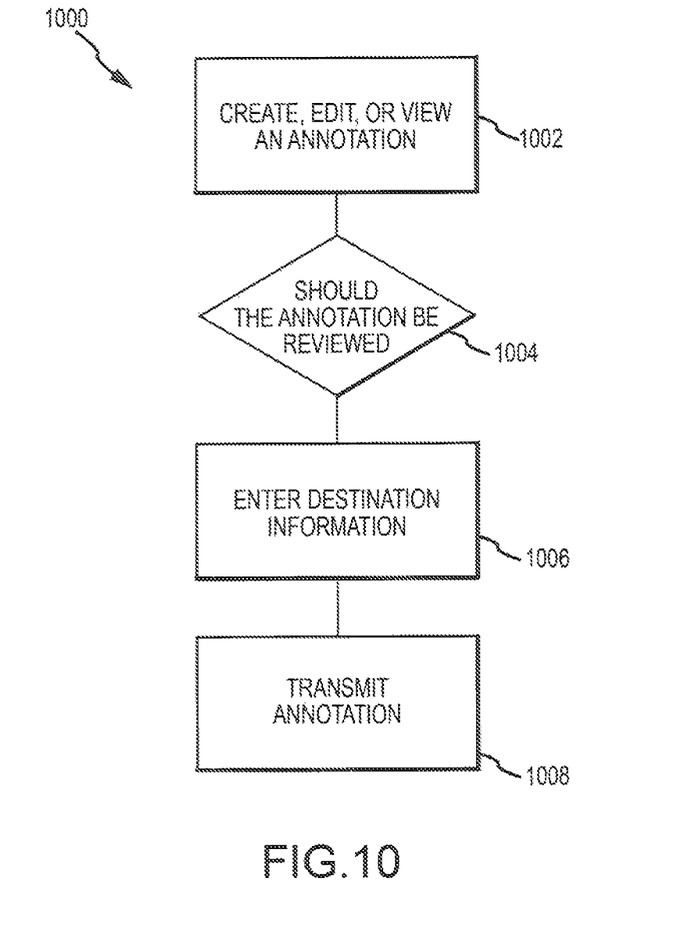
FIG. 10 is a flowchart illustrative of a methodology according to one aspect of the technology of the present application.

In certain situations, it may be necessary or desirable to provide an annotation such that the next operator or user will provide additional information not necessarily clear from the object. Thus, annotation system 300 is provided with a messaging component 308. Messaging component 308 may function similar to a conventional email system or a conventional short message service system, which will not be explained except to the extent it is required for the technology of the present application. In those instances when an annotation is desired to be sent to a subsequent user, such as, for example, an annotation for a data object, the originator (i.e., the user creating, editing, or requesting review) of the annotation may tag the annotation with a destination, such as, for example, 303-555-1234 for a SMS system such that the annotation would be transmitted to the destination associated with 303-555-1234. FIG. 1000 shows a methodology 1000 associated with forwarding an annotation for further review, input, consideration, approval or the like. First, the originator creates, edits, or views an annotation associated with either a screen field or an object associated with networked computer system 100, step 1002. Next, a decision is made whether the annotation needs to be reviewed, considered, etc., step 1004. If the annotation needs to be forwarded, a destination tag is provided, such as, for example, a SMS address or an email address, or other electronic identification as associated with the messaging system 308, step 1006. The messaging system 308 would transmit the annotation to the indicated address, step 1008.

In certain aspects, various data objects may be associated with different modules and/or routines associated with the networked computer system 100. For example, the networked computer system 100 in a VMS system may include "work orders" and "assignments." Each of these descriptions have "start dates." Thus, for information annotated to an assignment start date may be set as an equivalent to the work order start date such that the annotations are shared between the data elements. The equivalence between data objects may be set by the annotation management system or established by system administrators. Also, when setting an annotation, the originator may be requested to link any annotations to equivalent data elements.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory. Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for displaying an annotation linked to at least one field of a graphical user interface or at least one data object displayable at a workstation that operatively transmits and receives data objects from a software-as-a-service application in a networked computer system, the method comprising steps performed on at least one processor comprising:

providing an annotation memory storing at least one annotation, wherein the at least one annotation is linked to the at least one field of the graphical user interface or at least one data object and associated with at least one of a plurality of separate entities operably connected to the software-as-a-service application in the networked computer system;

updating the software-as-a-service application, wherein the update includes the at least one annotation linked to the at least one field of the graphical user interface or the at least one data object to be displayed, and wherein the at least one annotation comprises information regarding the update;

transmitting the graphical user interface to a workstation of a specific one of the plurality of separate entities of the networked computer system to be displayed on the display of the workstation and allow a user to operatively transmit and receive at least one data object with the software-as-a-service application;

recognizing the at least one field of the graphical user interface or the at least one data object to be displayed has the at least one annotation linked to the at least one field or the at least one data object, wherein the recognizing step comprises determining whether the at least one field of the graphical user interface or the at least one data object has indicia identifying the at least one annotation exists;

fetching the at least one annotation linked to the at least one field or the at least one data object;

determining whether the specific entity of the plurality of separate entities is the at least one of the plurality of separate entities associated with the at least one annotation; and transmitting the at least one annotation linked to the at least one field or data object to the workstation if the specific entity is the at least one of the plurality of separate entities associated with the at least one annotation, wherein the at least one annotation may be displayed on the display of the at least one workstation or stored in a memory of the at least one workstation for display.

2. The method of claim 1 wherein the recognizing step further comprises recognizing a type of annotation linked to the at least one field, where the type of annotation is selected from a group of annotation types consisting of: text, image, audio, video, audio/video, or a combination thereof.

3. The method of claim 1 wherein the at least one annotation contains instructional data.

4. The method of claim 3 wherein the instructional data includes instructions regarding at least one of a new version or an update to the transmitted graphical user interface.

5. The method of claim 3 wherein the instructional data comprises instructions on entering data into the at least one field of the graphical user interface to which the annotation is linked.

6. The method of claim 1 wherein the at least one annotation fetched is automatically displayed on the transmitted graphical user interface.

7. The method of claim 1 further comprising the step of selectively hiding the at least one annotation.

8. The method of claim 1 wherein the at least one annotation is displayed when activated in the graphical user interface.

9. A method for displaying at least one annotation linked to at least one field of a graphical user interface or at least one data object in a networked computer system where a plurality of independent entities access the networked computer system, the method comprising steps performed on at least one processor comprising:

updating the graphical user interface or data object, wherein the at least one annotation comprises information regarding the update;

transmitting the updated graphical user interface or data object to a workstation of at least one entity of the plurality of independent entities of the networked computer system to be displayed on the display of the workstation;

recognizing the at least one entity of the plurality of independent entities to which the graphical user interface is transmitted;

recognizing the at least one field of the graphical user interface or the at least one data object to be displayed has at least one annotation linked to both the at least one entity of the plurality of independent entities and the at least one field or at least one data object;

fetching the at least one annotation linked to the at least one entity and the at least one field or at least one data object; and transmitting the at least one annotation linked to the recognized entity to the workstation, wherein the at least one annotation may be displayed on the display of the at least one workstation or stored in a memory of the at least one workstation for display, wherein the transmitting of the updated graphical user interface or the data object includes transmitting indicia that the at least one field of the displayed graphical user interface has at least one annotation linked to the at least one field or data object, wherein the at least one annotation is transmitted to only the recognized at least one entity of the plurality of entities.

10. The method of claim 9 wherein the recognizing step further comprises recognizing a type of annotation linked to the at least one field, where the type of annotation is selected from a group of annotation types consisting of: text, image, audio, video, audio/video, or a combination thereof.

11. The method of claim 9 wherein the at least one annotation contains instructional data.

12. The method of claim 11 wherein the instructional data includes instructions regarding the update to the transmitted graphical user interface.

13. The method of claim 11 wherein the instructional data comprises instructions on entering data into the at least one field of the graphical user interface to which the annotation is linked.

14. The method of claim 9 wherein the at least one annotation fetched is automatically displayed on the transmitted graphical user interface.

15. The method of claim 9 further comprising the step of selectively hiding the at least one annotation.

16. The method of claim 9 wherein the at least one annotation is displayed when activated in the graphical user interface.

17. A networked computer system operatively coupled to workstations of a plurality of independent and separate entities that display at least one graphical user interface having fields and data objects stored in a memory, the networked computer system comprising:

an annotation memory, wherein the annotation memory comprises data including at least one entity of the plurality of independent and separate entities and at least one annotation; and an annotation processor, wherein the annotation processor is configured to:

update the graphical user interface or data object, wherein the at least one annotation comprises information regarding the update;

transmit the updated graphical user interface or data object for the at least one entity to a workstation of the at least one entity of the networked computer system;

recognize that at least one field of the graphical user interface or the data object to be displayed has at least one annotation for the at least one entity of the plurality of independent and separate entities linked to the at least one field or data object, and provide indicia identifying that the at least one annotation exists to be displayed;

fetch the at least one annotation linked to the at least one field or data object; and transmit the indicia and the at least one annotation linked to the at least one field or data object to the workstation, wherein the at least one annotation may be displayed on the display of the at least one workstation or stored in a memory of the at least one workstation for display.

\* \* \* \* \*